United States Patent
Surampudi et al.

(10) Patent No.: US 11,557,797 B2
(45) Date of Patent: Jan. 17, 2023

(54) CONTROL OF LITHIUM PLATING OF LITHIUM-ION BATTERY DURING CHARGING

(71) Applicant: Southwest Research Institute, San Antonio, TX (US)

(72) Inventors: Bapiraju Surampudi, San Antonio, TX (US); Kevin Jones, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 183 days.

(21) Appl. No.: 17/002,380

(22) Filed: Aug. 25, 2020

(65) Prior Publication Data

US 2022/0069361 A1 Mar. 3, 2022

(51) Int. Cl.
  *H01M 10/42* (2006.01)
  *H01M 10/48* (2006.01)

(52) U.S. Cl.
  CPC ....... *H01M 10/425* (2013.01); *H01M 10/484* (2013.01); *H01M 2010/4271* (2013.01); *H01M 2220/20* (2013.01)

(58) Field of Classification Search
  CPC ............. H01M 10/425; H01M 10/484; H01M 2010/4271; H01M 2220/20
  See application file for complete search history.

(56) References Cited

U.S. PATENT DOCUMENTS

| | | | | |
|---|---|---|---|---|
| 2013/0278223 A1* | 10/2013 | Li | ........................ | H02J 7/00041 320/136 |
| 2015/0326038 A1* | 11/2015 | Lee | ......................... | H02J 7/342 320/134 |
| 2016/0336765 A1* | 11/2016 | Trimboli | ................ | H02J 7/0048 |
| 2017/0259689 A1* | 9/2017 | Lee | ........................... | B60L 3/12 |
| 2019/0023132 A1* | 1/2019 | Yonemoto | ............... | B60L 50/16 |

OTHER PUBLICATIONS

Written Opinion of the International Searching Authority PCT/US21/47039.

* cited by examiner

*Primary Examiner* — Alexander Usyatinsky
(74) *Attorney, Agent, or Firm* — Livingston Law Firm

(57) ABSTRACT

A method of controlling the charge current during charging of a lithium-ion battery. A battery charging controller is based on a Kalman filter, which uses estimated battery states to generate a feedback metric to continually adjust a battery cell model. The battery cell model then delivers data to an optimization process that generates the charge current.

16 Claims, 2 Drawing Sheets

CONTROL OF LITHIUM PLATING OF LITHIUM-ION BATTERY DURING CHARGING

TECHNICAL FIELD OF THE INVENTION

This invention relates to rechargeable batteries, and more particularly to minimizing lithium plating during charging of lithium-ion batteries.

BACKGROUND OF THE INVENTION

A lithium-ion battery is a type of rechargeable battery. Lithium-ion batteries are used for diverse applications such as portable electronics and electric vehicles and are growing in popularity for many additional applications.

In these batteries, lithium ions move from a negative electrode through an electrolyte to a positive electrode during discharge, and back when charging. Lithium-ion batteries use an intercalated lithium compound as the material at the positive electrode and typically graphite at the negative electrode.

Research is ongoing for lithium-ion batteries in areas such as battery life extension, energy density, safety, cost reduction, and charging speed. One field of research is investigation of "lithium plating", which occurs during certain charging conditions and can be detrimental to battery life and safety. The phenomena of lithium plating has been difficult to analyze and prevent.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to minimization of lithium plating during charging of lithium-ion batteries. A battery charging controller is based on a Kalman filter, which uses estimated battery states to generate a feedback metric to continually adjust a battery cell model. The battery cell model then delivers data to an optimization process that generates the charge current.

The method is particularly useful for changing lithium-ion batteries of electric vehicles. As explained below, these vehicles have existing battery management systems, and the method and system described below are easily integrated into a battery management system. However, many other battery charging applications are possible.

Figure 1:
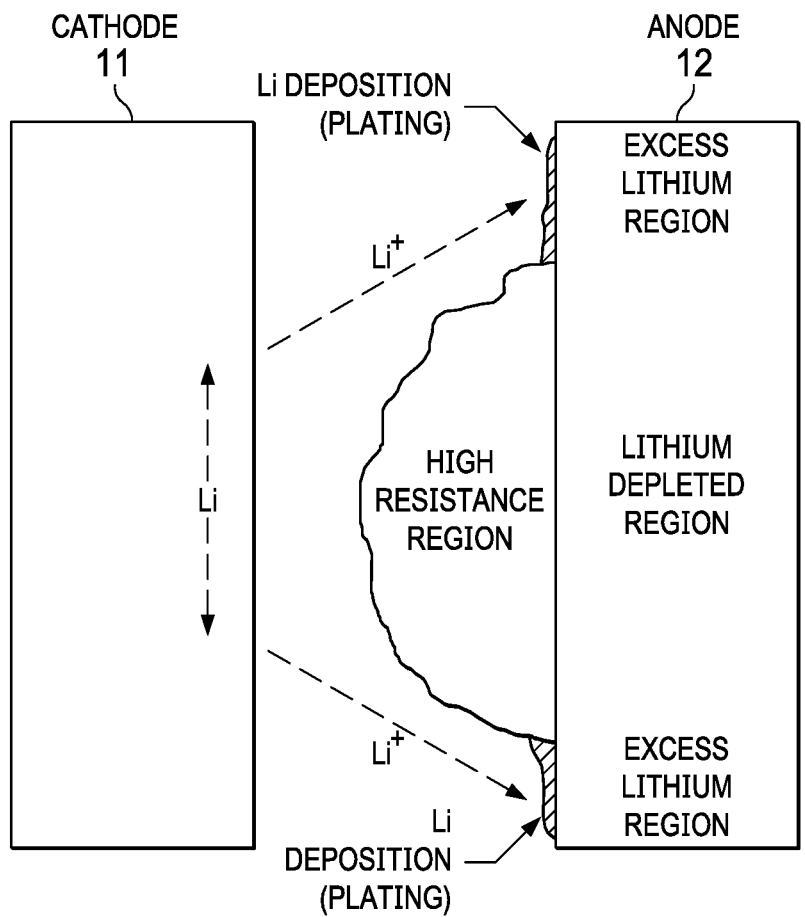
FIGS. 1 and 2 illustrate lithium plating of a lithium-ion battery.

FIG. 1 is a representative illustration of the formation of lithium plating during charging of a lithium-ion battery. The battery is represented by its cathode 11 and anode 12. During the charging process, lithium ions from the cathode 11 are inserted into compounds in the anode 12. Lithium plating can occur during this "intercalation" process.

Lithium plating results in lithium deposits at the anode 12. It is a function of various factors, including the charge current, the environmental temperature during charging, and the state of charge of the battery.

Figure 2:
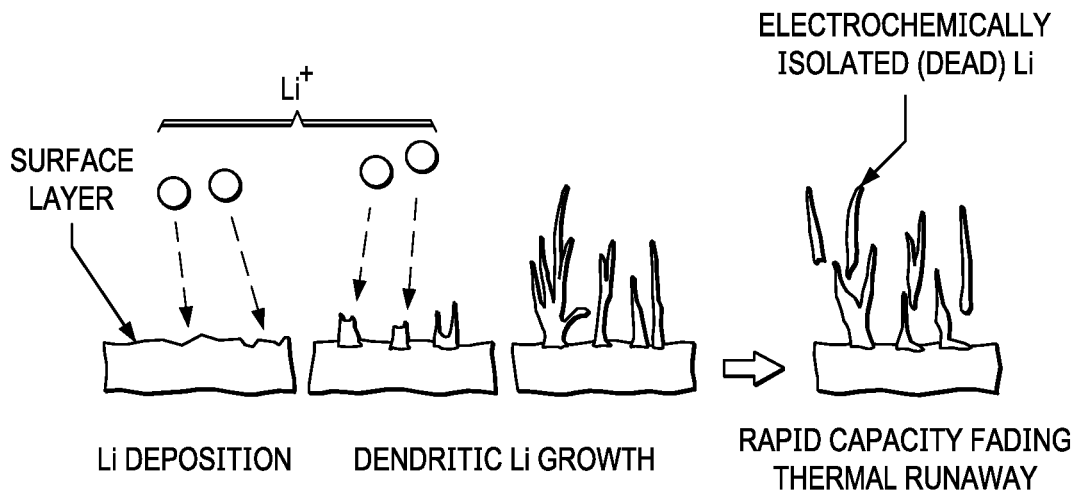

FIG. 2 further illustrates lithium plating at the graphite anode 12. Gradual dendritic lithium growth occurs at the anode 12. Eventually, the dendritic growth results in electrochemically isolated (dead) lithium.

Figure 3:
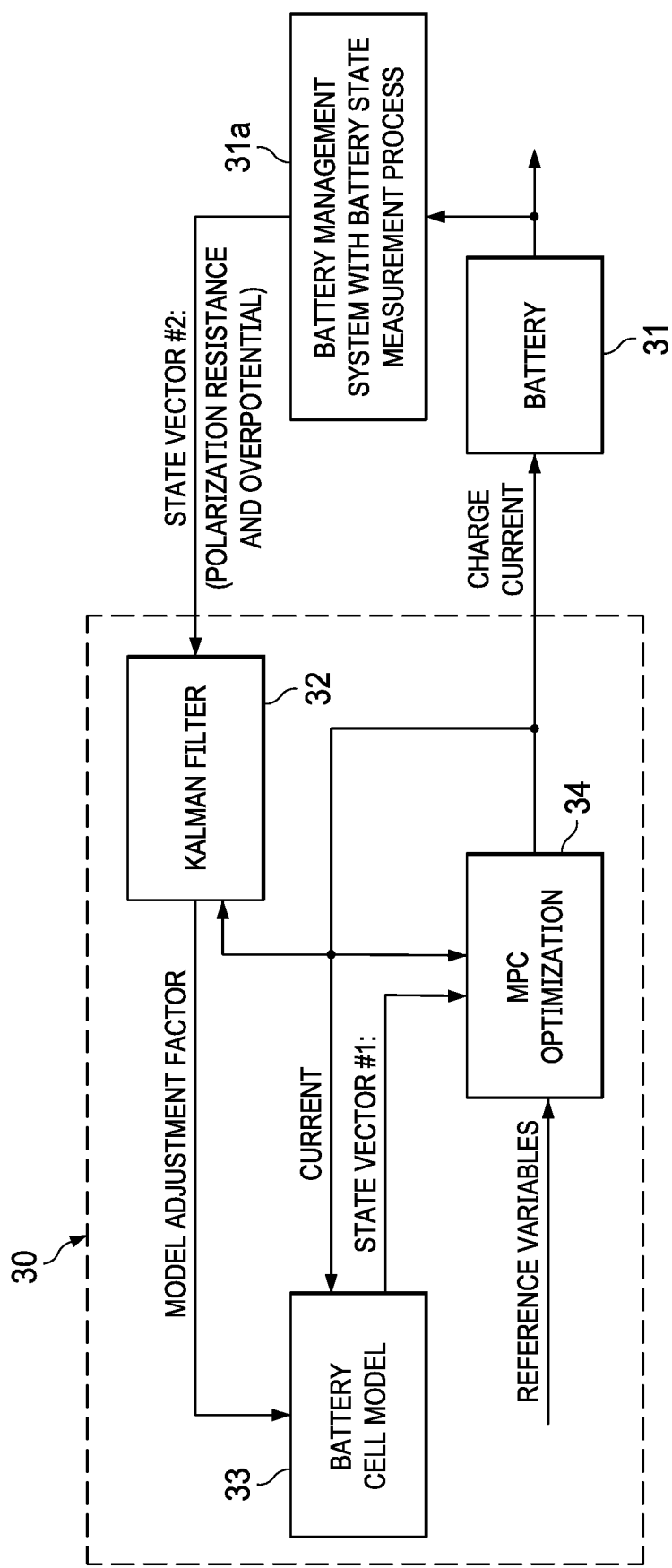
FIG. 3 illustrates a charge controller for determining the charge current during charging of a lithium-ion battery.

FIG. 3 schematically illustrates a battery charging controller 30 for controlling the charge current for fast charging of a lithium-ion battery 31. As stated above, the controller 30 is based on a Kalman filter 32 and a battery cell model 33. A model predictive control (MPC) optimization process 34 delivers a dynamically determined charge current to the battery 31.

It is assumed that each of the various "processes" described herein is implemented with appropriate hardware and programming. The hardware may include processing and memory devices, and the processes may be discrete, integrated into a single processing device, or included in more comprehensive processing equipment. It is expected that in practice, controller 30 will be integrated into a battery management system.

Kalman filter process 32 receives and uses independent battery state estimators to generate a feedback metric. In the example of this description, there are two such state estimators: the battery's polarization resistance and its electrolyte overpotential.

These state estimators are a series of values, which are measured during battery charging. They are identified in FIG. 3 as State Vector #2 and delivered to Kalman filter 32.

As explained below, polarization resistance and electrolyte overpotential are measured indirectly. These and perhaps additional values of State Vector #2 can be measured (directly or indirectly) by devices typically installed in a conventional battery management system 31a that accompanies many lithium-ion batteries. In general, a conventional battery management system is an electronic system that manages a rechargeable battery (cell or battery pack), such as by protecting the battery from operating outside its safe operating area, monitoring its state, and reporting that data with some form of external communications.

Polarization resistance has a natural window for observation when a battery is hooked up to a charger and its charge is complete and stopped. Polarization resistance is calculated by using the slow relaxation of cell voltage divided by the small current that caused the relaxation immediately after completion of a charge event. Values are measured over a predetermined period, such as every 15 minutes.

Electrolyte overpotential, as labeled here, is estimated by a set of mathematical equations from only measurement of current and voltage as below. The estimates are based on the difference between estimates of electrolyte potential and anode potential. When that difference goes negative, it is a surrogate measurement of lithium plating. The magnitude of this negative potential is proportional to the extent of lithium plating. referred to as "overpotential".

Kalman filter process 32 uses the data of State Vector #2 to generate a feedback metric, referred to in FIG. 3 as a battery cell model adjustment factor. This model adjustment factor represents the present state of the battery as it is being charged.

Cell model process 33 stores a physics-based real-time cell model, which is calibrated by testing the battery to be charged (or one of the same type) for its material properties. Modeling a lithium-ion battery from the first principles of the internal electrochemical reactions can be tedious and computationally intractable. Thus, the cell model is a reduced order model, in the sense that it represents battery 31 in terms of a state vector, identified in FIG. 3 as State Vector #1. Various lithium-ion modeling techniques have been developed and can be used to create cell model 33.

For purposes of the method described herein, cell model process 33 estimates a set of various battery conditions to generate State Vector #1. These may include, without limitation, the battery's state of charge, anode potential, electrolyte potential, and solid electrolyte interphase (SEI) layer resistance.

In operation, Kalman filter process 32 receives the above-described data for State Vector #2, as a series of data over time. It further receives values representing the charge current. It generates an adjustment factor to be delivered to cell model process 33.

Cell model process 32 uses the adjustment factor to adjust its cell model. Cell model 32 also receives the charge current. Cell model 32 generates the above-described State Vector #1, which is delivered to optimization process 34.

There are various ways in which the adjustment factor from Kalman filter 32 may be used to adjust the battery cell model 33. In the embodiment of this description, the adjustment factor adapts values in the cell model related to electrode and electrolyte potentials such that measured value of plating and model estimated value of lithium plating match as close as possible. In this manner, the cell model is continually adapting and improving to match the reality of battery 31. The State Vector #1 derived from such a cell model will enable better control of charge current.

Optimization process 34 receives State Vector #1 and the charge current. Based on these values, optimization process 34 generates a charge current to be used for charging battery 31.

The above-described charging method can be described as an "optimal control" method, as compared to conventional charging methods. These conventional methods include constant-current constant-voltage (CC-CV) charging and time pulsed charging (TPC). However, because the extent of lithium plating is difficult to assess, these methods tend to favor a conservative trade-off away from fast charging times to avoid lithium plating. This results in slower charging and inconvenience to the consumer. Charging controller 30 provides a means to estimate the condition of the battery as it is being charged, so that the charge current can be adjusted.

The controller 30 may be easily integrated into the battery management system of any lithium ion battery. Such systems are typical for managing batteries of equipment such as vehicles.

What is claimed is:

1. A method of controlling the charge current during charging of a lithium-ion battery, comprising:
   storing a cell model of the battery as part of a cell model process;
   measuring battery state values of the battery, the battery states being at least: the battery's electrolyte overpotential and the battery's polarization resistance;
   delivering the battery state values to a Kalman filter process;
   processing the battery state values with the Kalman filter process to obtain a cell model adjustment factor;
   wherein the cell model process is programmed to receive the cell model adjustment factor and a charge current value, and based on the cell model, the cell model adjustment factor, and the charge current value, to generate a model state vector having one or more model state values representing at least the battery's state of charge;
   using an optimization process to generate a charge current for battery charging, based on the model state vector and the charge current value; and
   applying the charge current to the battery using a charging device;
   wherein polarization resistance is a function of voltage relaxation and wherein the measuring step is repeated during or after charging while the battery is connected to the charging device.

2. The method of claim 1, wherein the battery is a vehicle battery.

3. The method of claim 1, wherein the method is implemented as part of a battery management system of a vehicle battery.

4. The method of claim 1, wherein the model state vector further has model states of one or more of the following: anode potential, electrolyte potential, or solid electrolyte interphase layer resistance.

5. The method of claim 1, wherein the step of measuring battery state values is performed by a battery management system.

6. The method of claim 1, wherein polarization resistance is measured while the battery is hooked up to a charger and its charge is complete and stopped.

7. The method of claim 1, wherein the cell model is a reduced order model.

8. The method of claim 1, wherein the adjustment factor adjusts values in the cell model related to electrode and electrolyte potentials.

9. A controller for controlling the charge current during charging of a lithium-ion battery, comprising:
   a cell model process that stores a model of the battery;
   a Kalman filter process operable to receive measured battery state values of the battery, the battery states being at least: the battery's electrolyte overpotential and the battery's polarization resistance, polarization resistance being a function of voltage relaxation while the battery is connected to a charging device;
   wherein the Kalman filter process processes the battery state values to obtain a cell model adjustment factor;
   wherein the cell model process is programmed to receive the cell model adjustment factor and a charge current value, and based on the cell model, the cell model adjustment factor, and the charge current value, to generate a model state vector having one or more model state values representing at least the battery's state of charge; and
   an optimization process operable to generate a new charge current based on the model state vector and the charge current value.

10. The controller of claim 9, wherein the battery is a vehicle battery.

11. The controller of claim 9, wherein the controller is part of a battery management system of a vehicle battery.

12. The controller of claim 9, wherein the model state vector further has model states of one or more of the following: anode potential, electrolyte potential, or solid electrolyte interphase layer resistance.

13. The controller of claim 9, wherein polarization resistance is measured while the battery is hooked up to a charger and its charge is complete and stopped.

14. The controller of claim 9, wherein the cell model is a reduced order model.

15. The controller of claim 9, wherein the adjustment factor adjusts values in the cell model related to electrode and electrolyte potentials.

16. An improved battery management system for an electric vehicle having at least one lithium-ion battery, the improvement comprising:
- a measurement process for measuring or estimating battery state values, the battery state values being at least: the battery's electrolyte overpotential and the battery's polarization resistance, polarization resistance being a function of voltage relaxation while the battery is connected to a charging device;
- a charging controller for controlling the charge current during charging of the battery, comprising: a cell model process that stores a model of the battery; a Kalman filter process operable to receive the battery state values and to process the battery state values to obtain a cell model adjustment factor;
- wherein the cell model process is programmed to receive the cell model adjustment factor and a charge current value, and based on the cell model, the cell model adjustment factor, and the charge current value, to generate a model state vector having one or more model state values representing at least the battery's state of charge; and
- an optimization process operable to generate a new charge current based on the model state vector and the charge current value.

* * * * *